US008363722B2

(12) United States Patent
Gharavi-Alkhansari et al.

(10) Patent No.: US 8,363,722 B2
(45) Date of Patent: Jan. 29, 2013

(54) METHOD AND APPARATUS FOR HIERARCHICAL BI-DIRECTIONAL INTRA-PREDICTION IN A VIDEO ENCODER

(75) Inventors: Mohammad Gharavi-Alkhansari, Santa Clara, CA (US); Ali Tabatabai, Cupertino, CA (US); Mohammed Zubair Visharam, Santa Clara, CA (US)

(73) Assignees: Sony Corporation, Minato-Ku, Tokyo (JP); Sony Electronics Inc., Park Ridge, NJ (US)

( * ) Notice: Subject to any disclaimer, the term of this patent is extended or adjusted under 35 U.S.C. 154(b) by 299 days.

(21) Appl. No.: 12/415,901

(22) Filed: Mar. 31, 2009

(65) Prior Publication Data

US 2010/0246672 A1    Sep. 30, 2010

(51) Int. Cl.
*H04N 7/12* (2006.01)
*H04N 11/02* (2006.01)
(52) U.S. Cl. .............................. 375/240.12; 375/240.24
(58) Field of Classification Search .................... 375/240
See application file for complete search history.

(56) References Cited

U.S. PATENT DOCUMENTS

| 6,970,508 | B1 | 11/2005 | Kondo |
| 7,120,196 | B2 | 10/2006 | Yu et al. |
| 7,266,150 | B2 | 9/2007 | Demos |
| 7,298,913 | B2 | 11/2007 | Koto et al. |
| 7,308,029 | B2 | 12/2007 | Boice et al. |
| 2004/0028282 | A1 | 2/2004 | Kato et al. |
| 2007/0195888 | A1* | 8/2007 | Sabeti ...................... 375/240.24 |
| 2008/0037642 | A1 | 2/2008 | Tsuchiya et al. |

FOREIGN PATENT DOCUMENTS

| EP | 1538567 A2 | 6/2005 |
| EP | 1835760 A2 | 9/2007 |
| JP | 2007306276 A | 11/2007 |

OTHER PUBLICATIONS

Leontaris, Athanasios et al., "Compression Efficiency and Delay Tradeoffs for Hierarchical B-Pictures and Pulsed-Quality Frames," IEEE Transactions on Image Processing, vol. 16, No. 7, Jul. 2007, pp. 1726-1740.

* cited by examiner

*Primary Examiner* — Sath V Perungavoor
*Assistant Examiner* — Xiaolan Xu
(74) *Attorney, Agent, or Firm* — Moser Taboada

(57) ABSTRACT

Method and apparatus for hierarchical bi-directional intra-prediction in a video encoder is described. In some examples, initial reference blocks are selected in an image. Sets of blocks in the image are predicted successively over a plurality of stages based on a respectively plurality of templates, each of the plurality of templates including reference blocks selected from at least one of: the initial reference blocks; or previously encoded and reconstructed blocks of the image. The image is encoded in the video encoder using the initial reference blocks and the sets of blocks as predicted.

20 Claims, 15 Drawing Sheets

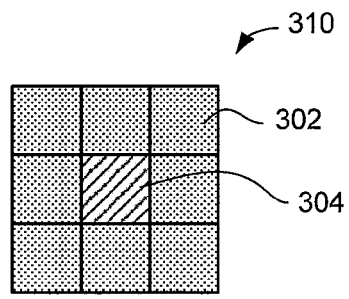
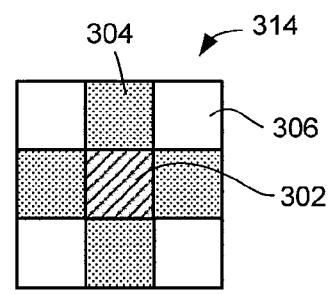
FIG. 4A                FIG. 4B
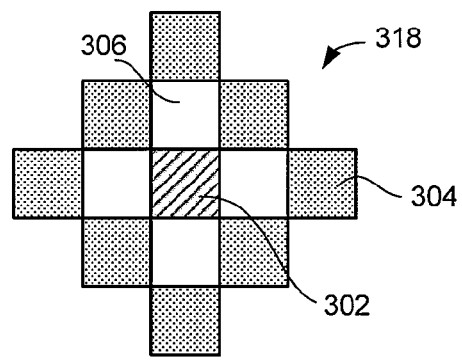
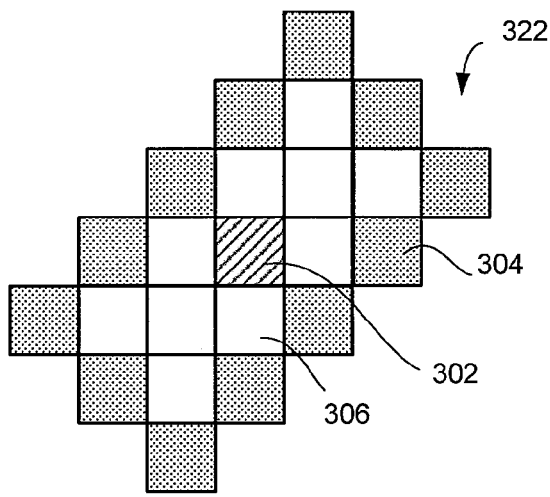
FIG. 4C                FIG. 4D

METHOD AND APPARATUS FOR HIERARCHICAL BI-DIRECTIONAL INTRA-PREDICTION IN A VIDEO ENCODER

BACKGROUND OF THE INVENTION

1. Field of the Invention

The present invention relates generally to video encoding. More particularly, the present invention relates to a method and apparatus for hierarchical bi-directional intra-prediction in a video encoder.

2. Description of the Related Art

Video compression is used in many current and emerging products, such as digital television set-top boxes (STBs), high definition television (HDTV) decoders, digital versatile disk (DVD) players, BLU-RAY disc players, digital camcorders, personal computers, and the like. Without video compression, digital video content can be extremely large, making it difficult or even impossible for the digital video content to be efficiently stored, transmitted, or viewed. There are numerous video coding methods that compress digital video content. Consequently, video coding standards have been developed to standardize the various video coding methods so that the compressed digital video content is rendered in formats that a majority of video decoders can recognize. For example, the Motion Picture Experts Group (MPEG) and International Telecommunication Union (ITU-T) have developed video coding standards that are in wide use. Examples of these standards include the MPEG-1, MPEG-2 (ITU-T H.262), MPEG-4, ITU-T H.261, ITU-T H.263, and ITU-T H.264 standards.

Video encoding standards, such as MPEG standards, typically achieve data compression by utilizing various coding techniques, such as spatial and temporal prediction, transform and quantization, entropy encoding, and the like. Prediction in video encoders is typically includes both inter-prediction and intra-prediction for improving coding efficiency. Inter-prediction exploits the temporal correlation between images of video, whereas intra-prediction exploits the spatial correlation of pixels within an image of video. Both types of prediction are typically performed on blocks of pixels.

For intra-prediction, the prediction of a block is formed by extrapolating from neighboring samples of previously coded and reconstructed blocks, and then the difference between the block and its prediction is coded. Such a technique, however, does not work well with images having complex textures. Furthermore, the farther the pixels being predicted are from the surrounding pixels, the greater the error in prediction.

Accordingly, there exists a need in the art for intra-prediction in a video encoder that can overcome the aforementioned deficiencies.

SUMMARY OF THE INVENTION

Aspects of the invention relate to a method and apparatus for image encoding in a video encoder. In some embodiments, initial reference blocks are selected in an image. Sets of blocks in the image are predicted successively over a plurality of stages based on a respectively plurality of templates, each of the plurality of templates including reference blocks selected from at least one of: the initial reference blocks; or previously encoded and reconstructed blocks of the image. The image is encoded in the video encoder using the initial reference blocks and the sets of blocks as predicted.

Another aspect of the invention relates to an apparatus for image encoding. In some embodiments, the apparatus includes: a prediction circuit configured to select initial reference blocks in an image, and predict sets of blocks in the image successively over a plurality of stages based on a respectively plurality of templates, each of the plurality of templates including reference blocks selected from at least one of: the initial reference blocks; or previously encoded and reconstructed blocks of the image; and an encoder circuit, coupled to the prediction circuit, configured to encode the image using the initial reference blocks and the sets of blocks as predicted.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 4A through 4E show prediction neighborhoods for blocks to be predicted in the templates of FIGS. 3A through 3E, respectively;

DETAILED DESCRIPTION

It should be noted that although aspects of the present invention are described within the context of H.264/MPEG-4 AVC, the present invention is not so limited. Namely, the video encoder can be an H.264/MPEG-4 AVC compliant encoder or an encoder that is compliant to any other compression standards that are capable of exploiting the intra prediction scheme.

Figure 1:
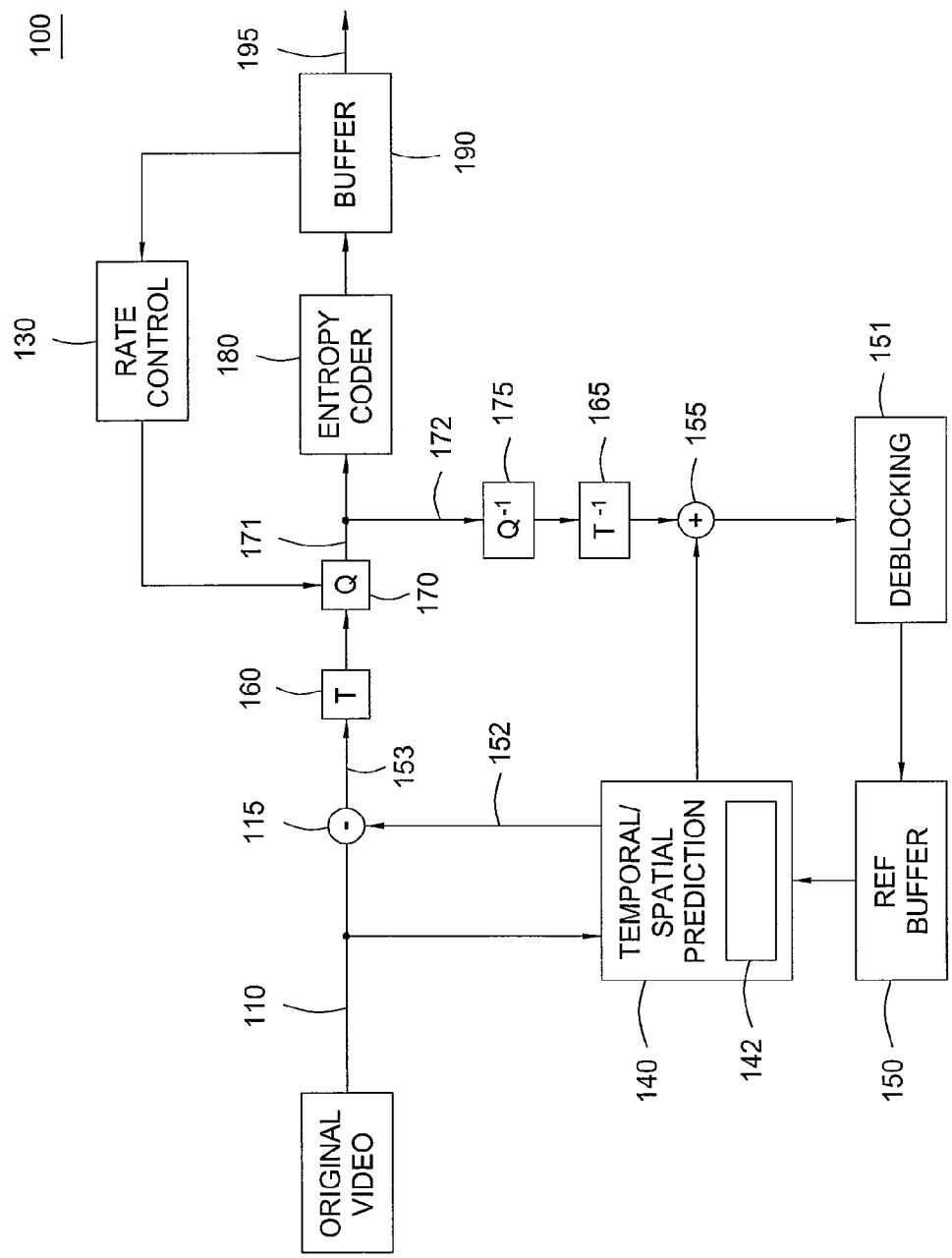
FIG. 1 is a block diagram depicting an exemplary video encoder in accordance with one or more aspects of the invention.

FIG. 1 is a block diagram depicting an exemplary video encoder 100 in accordance with one or more aspects of the invention. The video encoder 100 comprises a temporal/spatial prediction circuit 140, a rate control circuit 130, a transform circuit 160, a quantization (Q) circuit 170, an entropy encoder 180, a buffer (BUF) 190, an inverse quantization ($Q^{-1}$) circuit 175, an inverse DCT ($DCT^{-1}$) transform circuit 165, a subtractor 115, a summer 155, a deblocking circuit 151, and a reference buffer 150. Although the video encoder 100 comprises a plurality of circuits, those skilled in the art will appreciate that the functions performed by the various circuits are not required to be isolated into separate circuits as shown in FIG. 1.

Input video data comprises a sequence of pictures, where each picture is a field or frame (two interlaced fields) having an array of luminance (luma) samples and two arrays of chrominance (chroma) samples. Each picture can be further divided into slices, which can be divided into macroblocks, which can be divided into blocks of different sizes. The input video data is coupled the temporal/spatial prediction circuit 140 via path 110. The temporal/spatial prediction circuit 140 performs both inter-prediction processing and intra-prediction processing, depending on a selected coding mode (the temporal/spatial prediction circuit is also generally referred to as a "prediction circuit"). In the area of coding mode decision, MPEG provides a plurality of different coding modes. Generally, these coding modes are grouped into two broad classifications, inter coding and intra coding. Intra coding involves the coding of a block, macroblock, or slice in a picture using intra prediction, which is a prediction derived from only from the same decoded picture. Conversely, inter coding involves the coding of a block, macroblock, or slice in a picture using inter prediction, which is a prediction derived from decoded picture(s) other than the current picture. The temporal/spatial prediction circuit 140 can implement any inter-prediction technique known in the art. Embodiments of an intra prediction process performed by the temporal/spatial prediction circuit 140 are described below.

Once a coding mode is selected, the temporal/spatial prediction circuit 140 generates a predicted image on path 152 of the contents of the block based on past and/or future reference pictures. This prediction on path 152 is subtracted via the subtractor 115 from the video image on the path 110 in the current block to form an error signal or predictive residual signal on path 153. The predictive residual signal on the path 153 is passed to the transform module 160 for encoding.

The transform module 160 then applies a discrete cosine transform based (DCT-based) transform. Specifically, in H.264/MPEG-4 AVC, the transformation is applied to 4×4 blocks, where a separable integer transform is applied. An additional 2×2 transform is applied to the four DC coefficients of each chroma component. The resulting transformed coefficients are received by the quantization module 170, where the transform coefficients are quantized. H.264/MPEG-4 AVC uses scalar quantization.

The resulting quantized transformed coefficients are then decoded in the inverse quantization module 175 and the inverse DCT module 165 to recover the reference picture(s) that will be stored in reference buffer 150. In H.264/MPEG-4 AVC, the in-loop deblocking filter 151 is also employed to minimize blockiness.

The resulting quantized transformed coefficients from the quantization module 170 are also received by the entropy encoder 180 via signal connection 171. The entropy encoder 180 may perform context-adaptive variable length coding (CAVLC) or context-adaptive binary arithmetic coding (CABAC), where the two-dimensional block of quantized coefficients is scanned using a particular scanning mode, e.g., a "zig-zag" order, to convert it into a one-dimensional string of quantized transformed coefficients.

The data stream is received into the buffer 190, which is a first in first out (FIFO) memory. A consequence of using different picture types and variable length coding is that the overall bit rate into the buffer 190 is variable. Namely, the number of bits used to code each frame can be different. In applications that involve a fixed-rate channel, the buffer 190 can be used to match the encoder output to the channel for smoothing the bit rate. Thus, the output signal of the buffer 190 is a compressed representation of the input video image 110, where it is output via a path 195. The rate control module 130 serves to monitor and adjust the bit rate of the data stream entering the buffer 190 for preventing overflow and underflow on the decoder side (within a receiver or target storage device, not shown) after transmission of the data stream.

In some embodiments, the circuits of the video encoder 100 can be implemented using one or more integrated circuits (ICs), discrete components, circuit boards, and the like, as well as combinations thereof. In some embodiments, one or more of the circuits of the video encoder 100 may be implemented functionally as modules in software (e.g., a processor executing software to perform the functionality of the module(s)).

Figure 2:
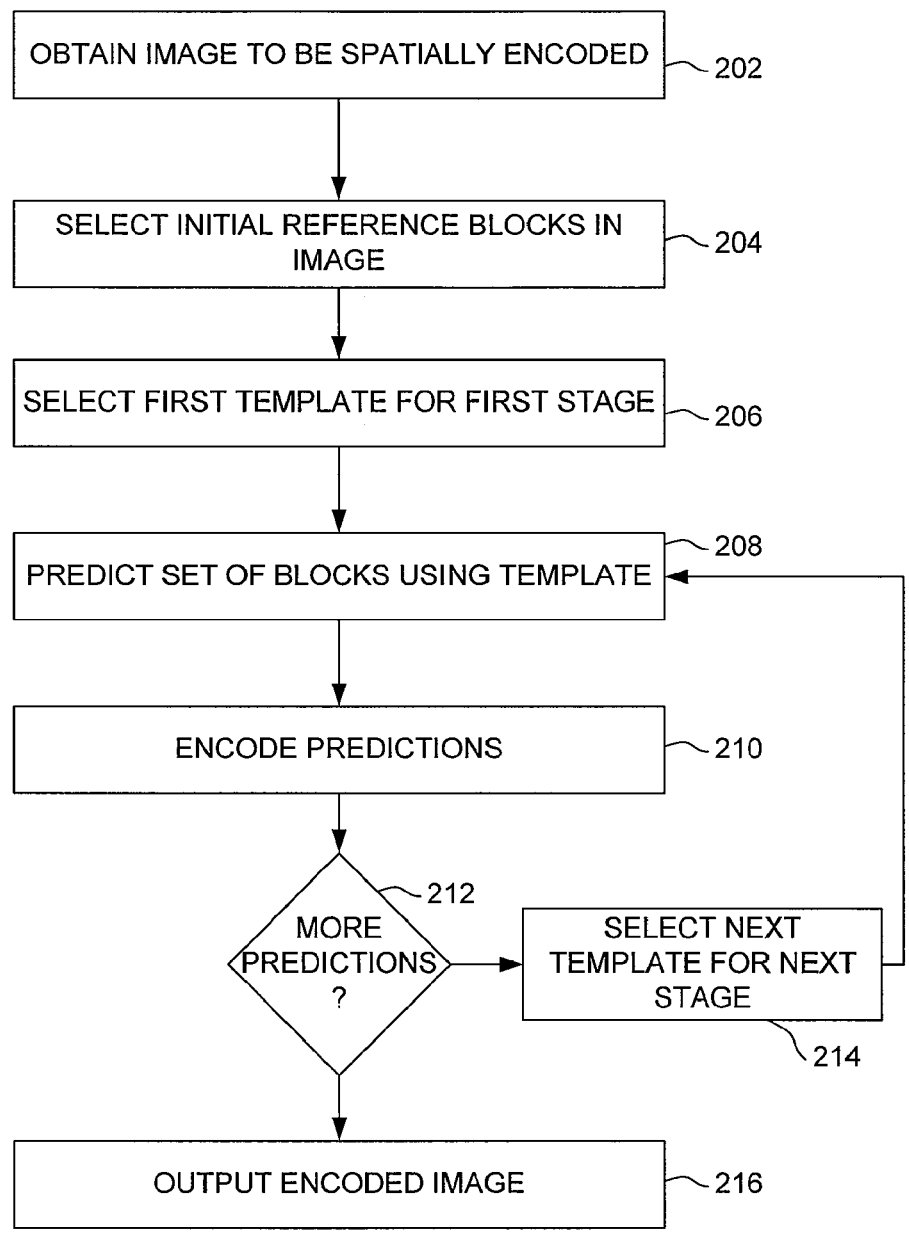
FIG. 2 is a flow diagram depicting an exemplary embodiment of a method of intra-prediction in a video encoder in accordance with one or more aspects of the invention.

FIG. 2 is a flow diagram depicting an exemplary embodiment of a method 200 of intra-prediction in a video encoder in accordance with one or more aspects of the invention. The method 200 implements a hierarchical bi-directional intra-prediction process for image compression. The method 200 may be implemented by the temporal/spatial prediction circuit 140 in the video encoder 100 shown in FIG. 1. The method 200 begins at step 202, where an image to be spatially coded is obtained. An "image" as used in the method 200 is meant to include a set of samples to be coded, such as a frame or portion of a frame (e.g., a slice). For example, the temporal/spatial prediction circuit 140 may select the intra coding mode to encode a particular input image.

At step 204, initial reference blocks in the image are selected. The initial reference blocks can include blocks previously encoded and reconstructed by the video encoder 100 (i.e., transformed, quantized, inverse quantized, and inverse transformed). One or more of the initial reference blocks may have been spatially predicted using unidirectional spatial prediction. For unidirectional spatial prediction, samples in a current block are predicted using previously coded and reconstructed samples disposed to the top or left of the current block. One or more of the initial reference blocks may be encoded directly without being predicted. The term "blocks" as used in the method 200 is meant to include any array of image samples, such as a macroblock or a block in macroblock.

At step 206, a first spatial prediction template ("template") is selected for a first spatial prediction stage ("stage"). The first template includes the initial reference blocks as reference blocks for spatial prediction. Exemplary embodiments of templates are described below. At step 208, a set of blocks in the image is predicted based on the reference blocks in the selected template. Some or all of the blocks in the set may be predicted bi-directionally. For bi-directional spatial prediction, samples in a block are predicted using previously coded and reconstructed samples disposed to the top or left of the block, as well as to the bottom or right of the block. At step 210, predictions for the set of blocks are encoded (e.g., transformed and quantized).

At step 212, a determination is made whether more blocks in the image are to be predicted. If so, the method 200 proceeds to step 214. At step 214, a next template is selected for a next prediction stage. The next template includes as reference blocks the initial reference blocks and previously encoded and reconstructed blocks of the image (i.e., blocks that were predicted in a previous stage). The method 200 then returns to step 208. If, at step 212, all the blocks in the image have been predicted, then the method 200 proceeds to step 216. At step 216, the image as intra coded is output (e.g., entropy coded and output in a stream).

Accordingly, the method 200 selects initial reference blocks in an image and predicts sets of blocks in the image successively over a plurality of stages based on a respectively plurality of templates. Each of the templates includes reference blocks selected from the initial reference blocks or both the initial reference blocks and previously encoded and reconstructed blocks in the image. The image is then spatially coded using the initial reference blocks and the sets of blocks as predicted.

The temporal/spatial prediction circuit 140 may be configured with a plurality of spatial prediction templates 142 for use in the above-described hierarchical bi-directional intra-prediction technique. In some embodiments, the temporal/spatial prediction circuit 140 may provide the templates 142 to the buffer 190 to be included in the output stream. The templates 142 may then be used by a decoder for recovering images that have been intra-predicted accordance with the technique described above. Alternatively, a decoder may be pre-configured with the templates 142, obviating the need to send the templates 142 in the output stream.

Figure 3A:
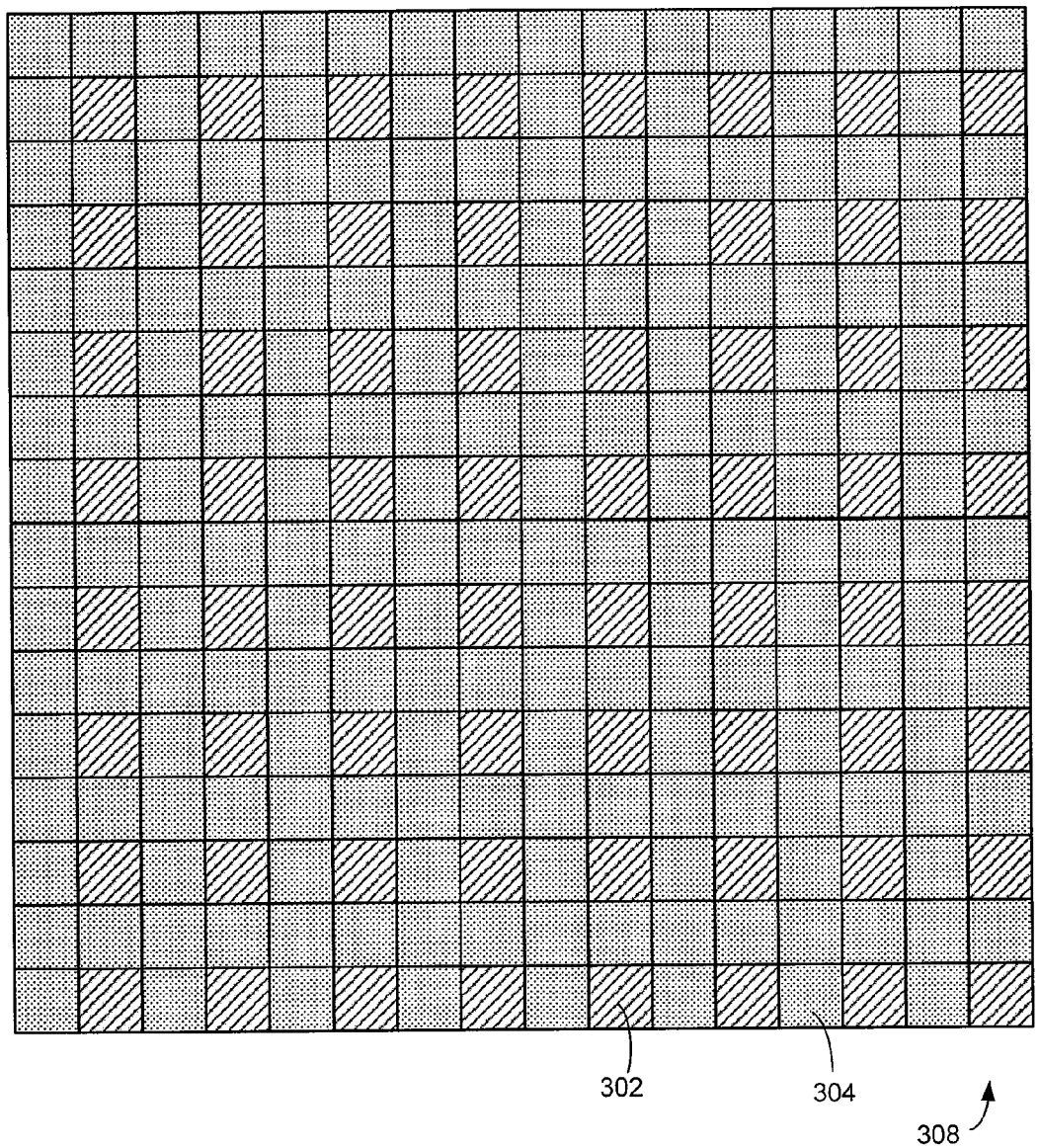
FIGS. 3A through 3F are block diagrams showing exemplary spatial prediction templates according to some embodiments of the invention.
Figure 3B:
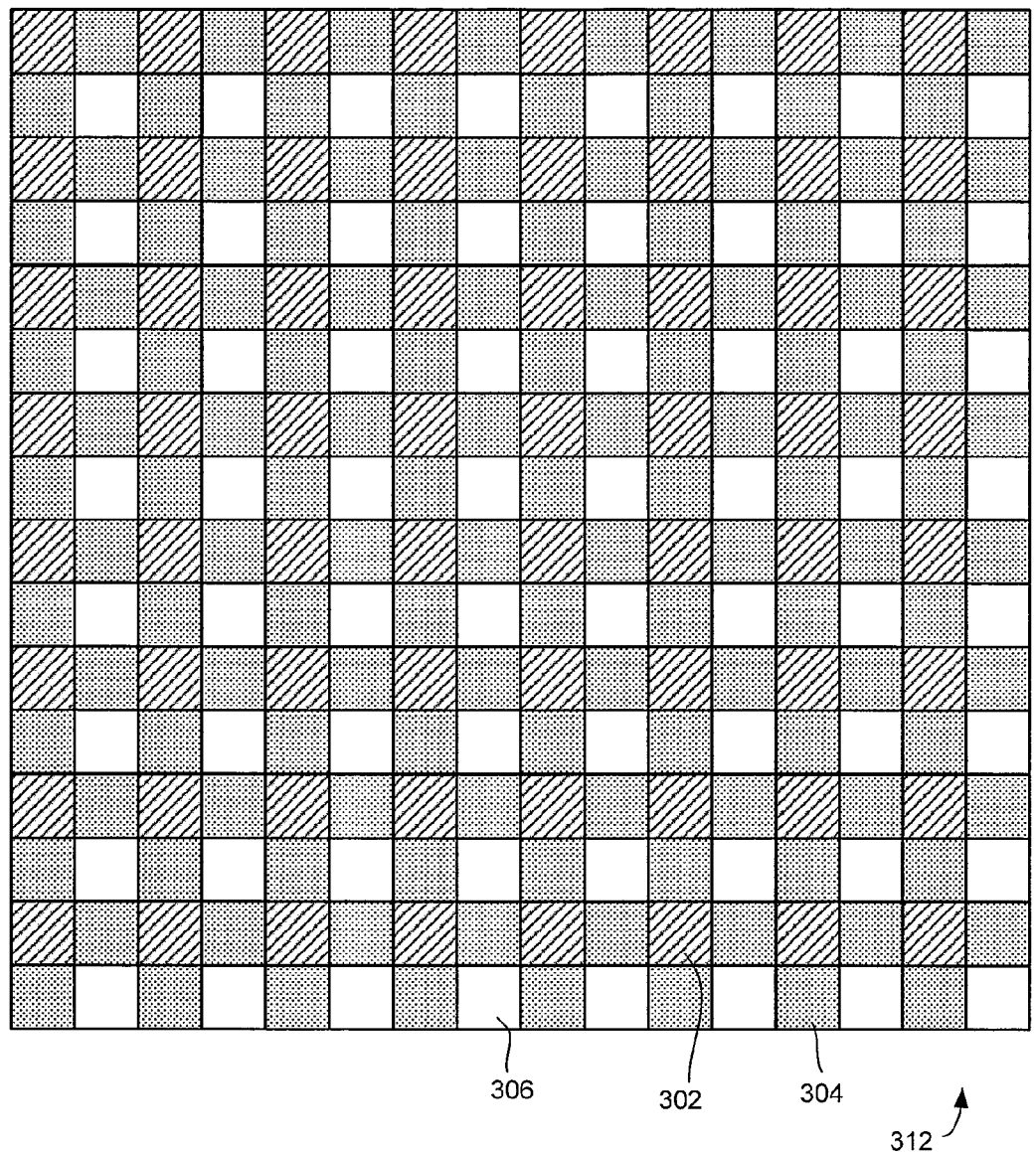
Figure 3C:
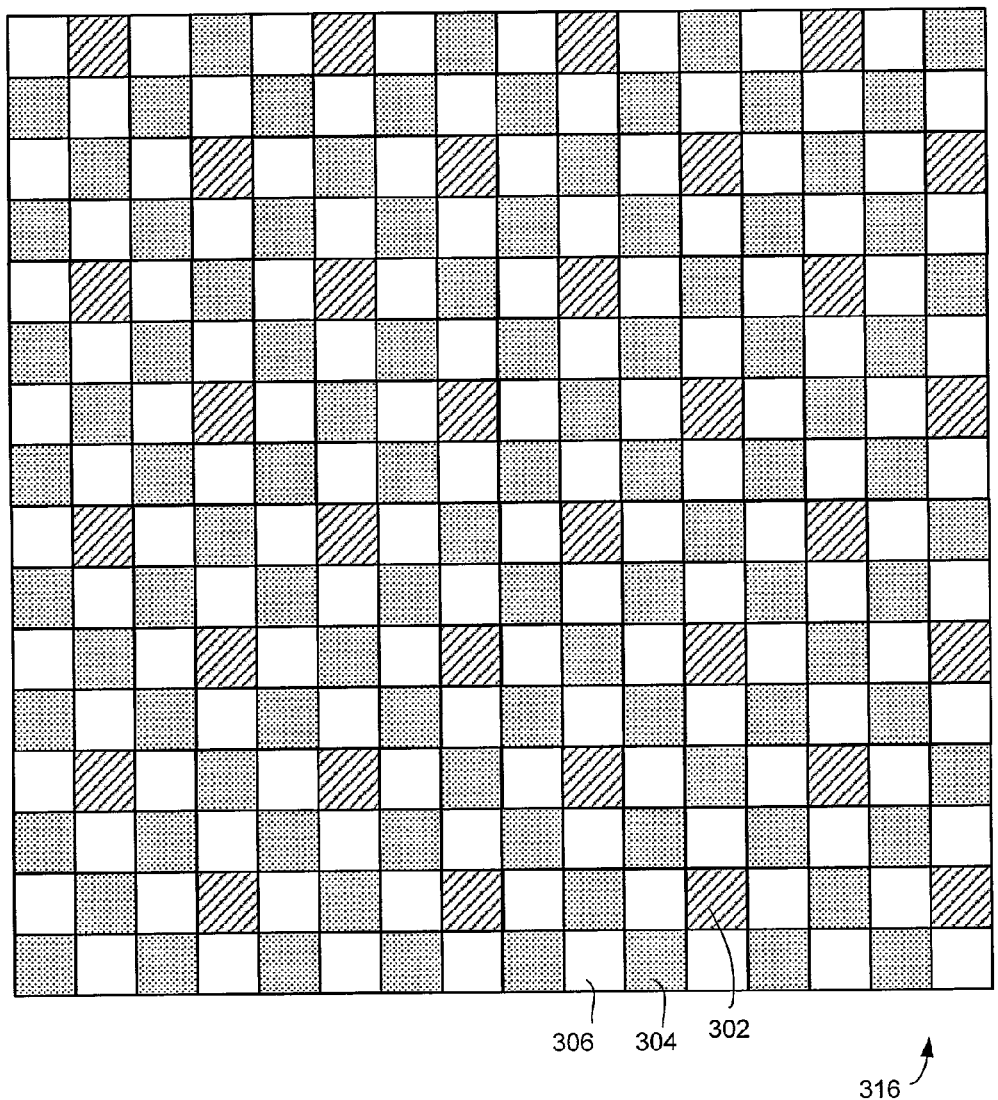
Figure 3D:
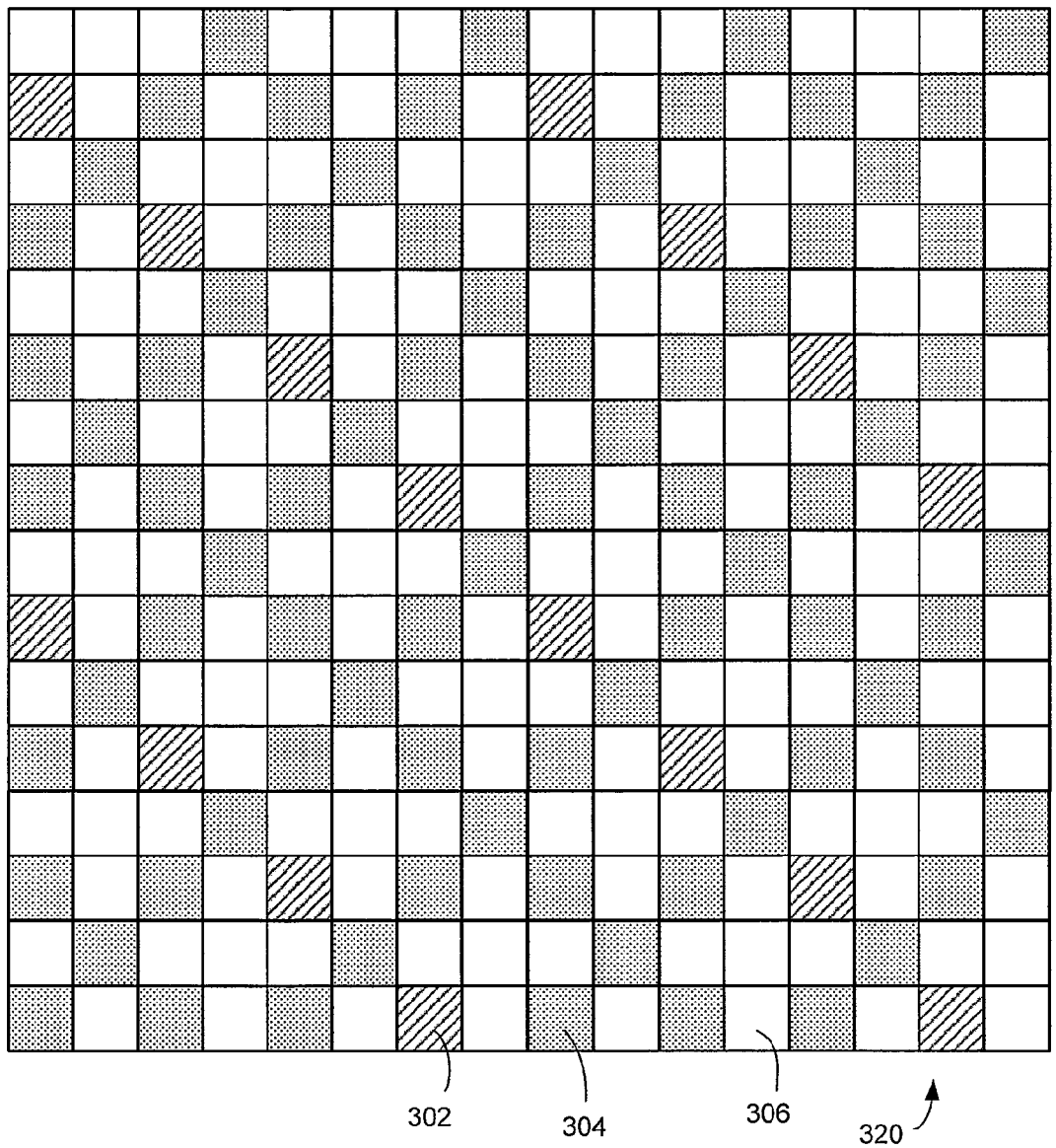
Figure 3E:
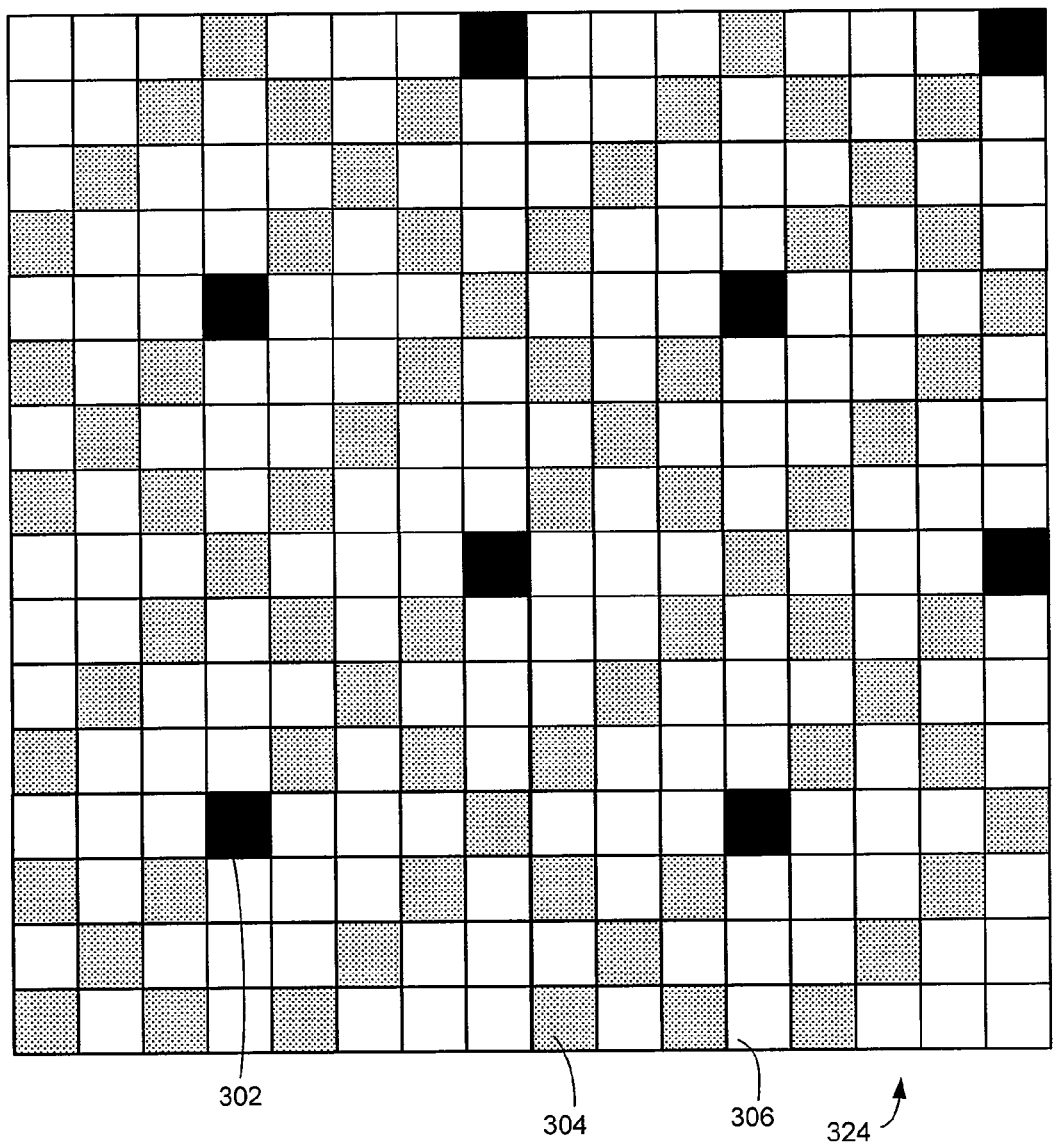
Figure 3F:
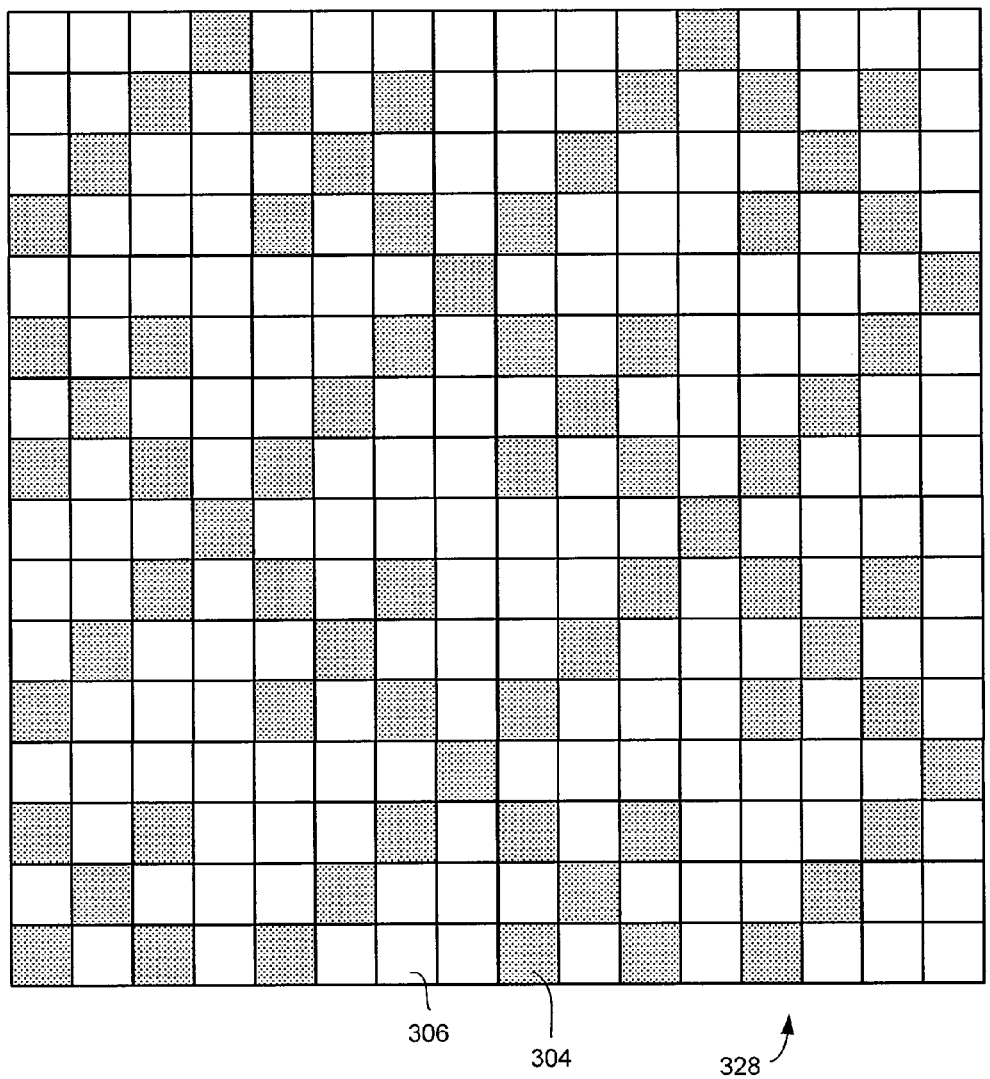

FIGS. 3A through 3F are block diagrams showing exemplary spatial prediction templates according to some embodiments of the invention. FIGS. 4A through 4E show prediction neighborhoods for blocks to be predicted in the templates of FIGS. 3A through 3E, respectively. The templates shown in FIGS. 3A through 3F can be used in the method 200 described above. The templates are shown in FIGS. 3A through 3F in reverse order from their use in the method 200 (e.g., the last template used is shown in FIG. 3A and the first template used is shown in FIG. 3F). In FIGS. 3A through 3F, blocks 302 are blocks to be predicted in a particular stage, blocks 304 are blocks previously coded, and blocks 306 are blocks yet to be predicted (to be predicted in another stage).

FIG. 3A shows a template 308 for a last stage of intra prediction. The template 308 provides the strongest prediction possible for the blocks 302 to be predicted. FIG. 4A shows a prediction neighborhood 310 for the template 308. Notably, the neighborhood 310 includes eight previously coded blocks 304 surrounding a block 302 to be predicted with no intervening blocks 306 yet to be predicted. The blocks 302 to be predicted may be predicted using bi-directional prediction, as shown in the neighborhood 310. One quarter of the total blocks in the image may be predicted using the template 308.

FIG. 3B shows a template 312 for a previous stage of intra prediction to the template 308. The template 312 provides a weaker prediction than the template 308. FIG. 4B shows a prediction neighborhood 314 for the template 312. Notably, the neighborhood 314 includes four previously coded blocks 304 surrounding a block 302 to be predicted with four blocks 306 yet to be predicted. The blocks 302 to be predicted may be predicted using bi-directional prediction, as shown in the neighborhood 314. One quarter of the total blocks in the image may be predicted using the template 312.

FIG. 3C shows a template 316 for a previous stage of intra prediction to the template 312. The template 316 provides a weaker prediction than the template 312. FIG. 4C shows a prediction neighborhood 318 for the template 306. Notably, the neighborhood 318 includes eight previously coded blocks 304 surrounding a block 302 to be predicted with four intervening blocks 306 yet to be predicted. Some of the previously coded blocks 304 in the neighborhood 318 are farther away from the block 302 to be predicted than in the neighborhood 314. The blocks 302 to be predicted may be predicted using bi-directional prediction, as shown in the neighborhood 318. One eighth of the total blocks in the image may be predicted using the template 316.

FIG. 3D shows a template 320 for a previous stage of intra prediction to the template 316. The template 320 provides a weaker prediction than the template 316. FIG. 4D shows a prediction neighborhood 322 for the template 320. Notably, the neighborhood 322 includes 12 previously coded blocks 304 surrounding a block 302 to be predicted with 10 intervening blocks 306 yet to be predicted. Some of the previously coded blocks 304 in the neighborhood 322 are farther away from the block 302 to be predicted than in the neighborhood 318. The blocks 302 to be predicted may be predicted using bi-directional prediction, as shown in the neighborhood 322. One sixteenth of the total blocks in the image may be predicted using the template 320.

Figure 4E:
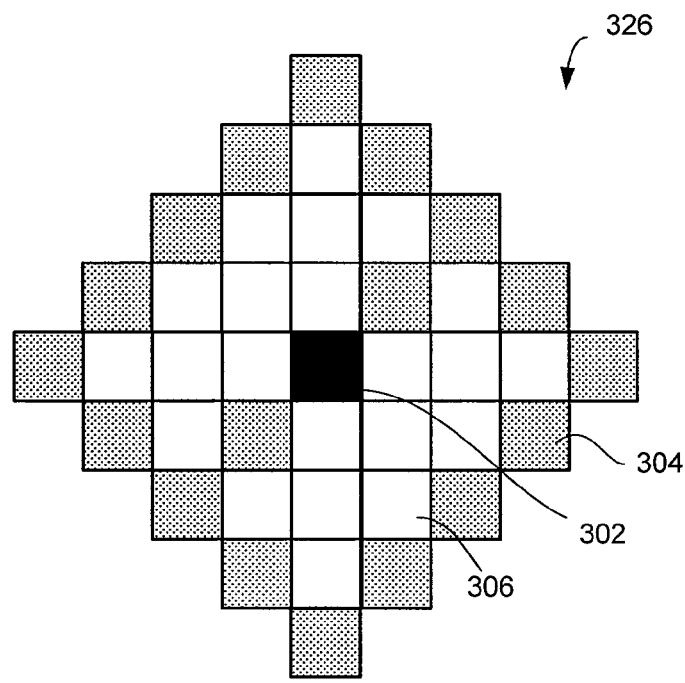

FIG. 3E shows a template 324 for a previous stage of intra prediction to the template 320. The template 324 provides a weaker prediction than the template 320. FIG. 4E shows a prediction neighborhood 326 for the template 324. Notably, the neighborhood 326 includes 18 previously coded blocks 304 surrounding a block 302 to be predicted with 22 intervening blocks 306 yet to be predicted. Some of the previously coded blocks 304 in the neighborhood 326 are farther away from the block 302 to be predicted than in the neighborhood 322. The blocks 302 to be predicted may be predicted using bi-directional prediction, as shown in the neighborhood 326. 1/32 of the total blocks in the image may be predicted using the template 324.

FIG. 3F shows a template 328 for a first stage of intra prediction. The previously coded blocks 304 in the template 328 are the initial reference blocks used for the spatial prediction process. The remaining blocks 306 yet to be predicted can be predicted hierarchically using the templates described above in FIGS. 3A through 3E.

As shown in FIG. 3F, 9/32 of the blocks in the image are selected as initial reference blocks. Further, six templates are employed to predict all of the blocks in the image. It is to be understood that more or less than six templates may be used. The less templates used, the more initial reference blocks need be selected. The more templates used, the less initial reference blocks need be selected. For example, it is readily apparent from the progression shown in FIGS. 3A through 3F that additional templates may be designed for more stages.

In general, the templates are configured such that the prediction gets stronger successively from the first stage to the last stage. In addition, the templates may be configured so that, in general, more blocks are predicted successively from the first stage to the last stage. In this manner, more blocks in the image are predicted using stronger predictions. The templates shown in FIGS. 3A through 3F are not unique. Different templates may be designed using the basic guidelines set forth above.

Figure 6A:
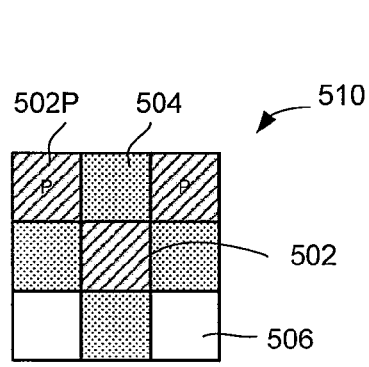
FIGS. 6A through 6C show prediction neighborhoods for blocks to be predicted in the templates of FIGS. 5A through 5C, respectively.
Figure 6B:
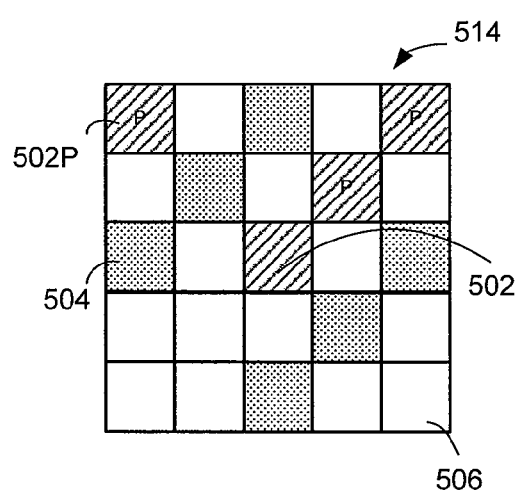
Figure 5A:
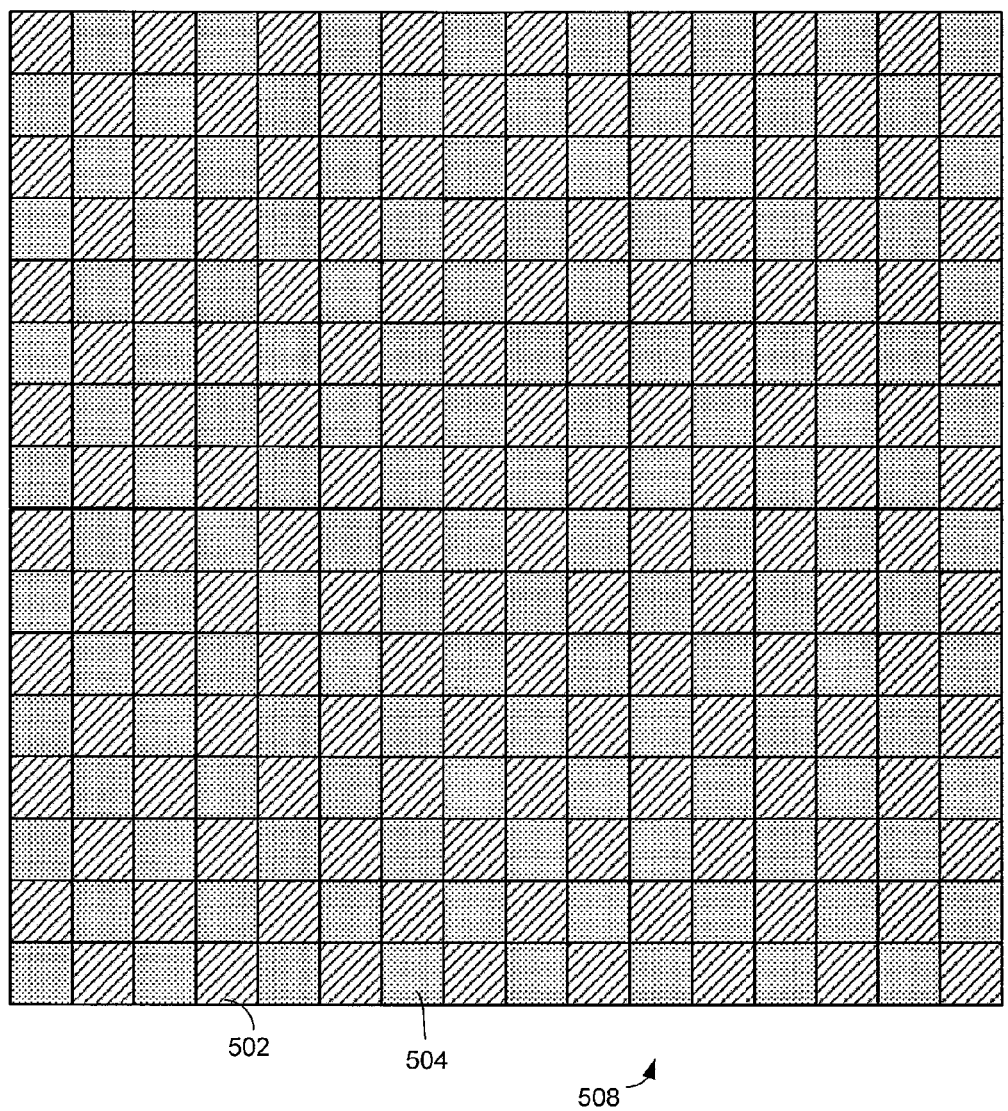
FIGS. 5A through 5D are block diagrams showing exemplary spatial prediction templates according to other embodiments of the invention.
Figure 5B:
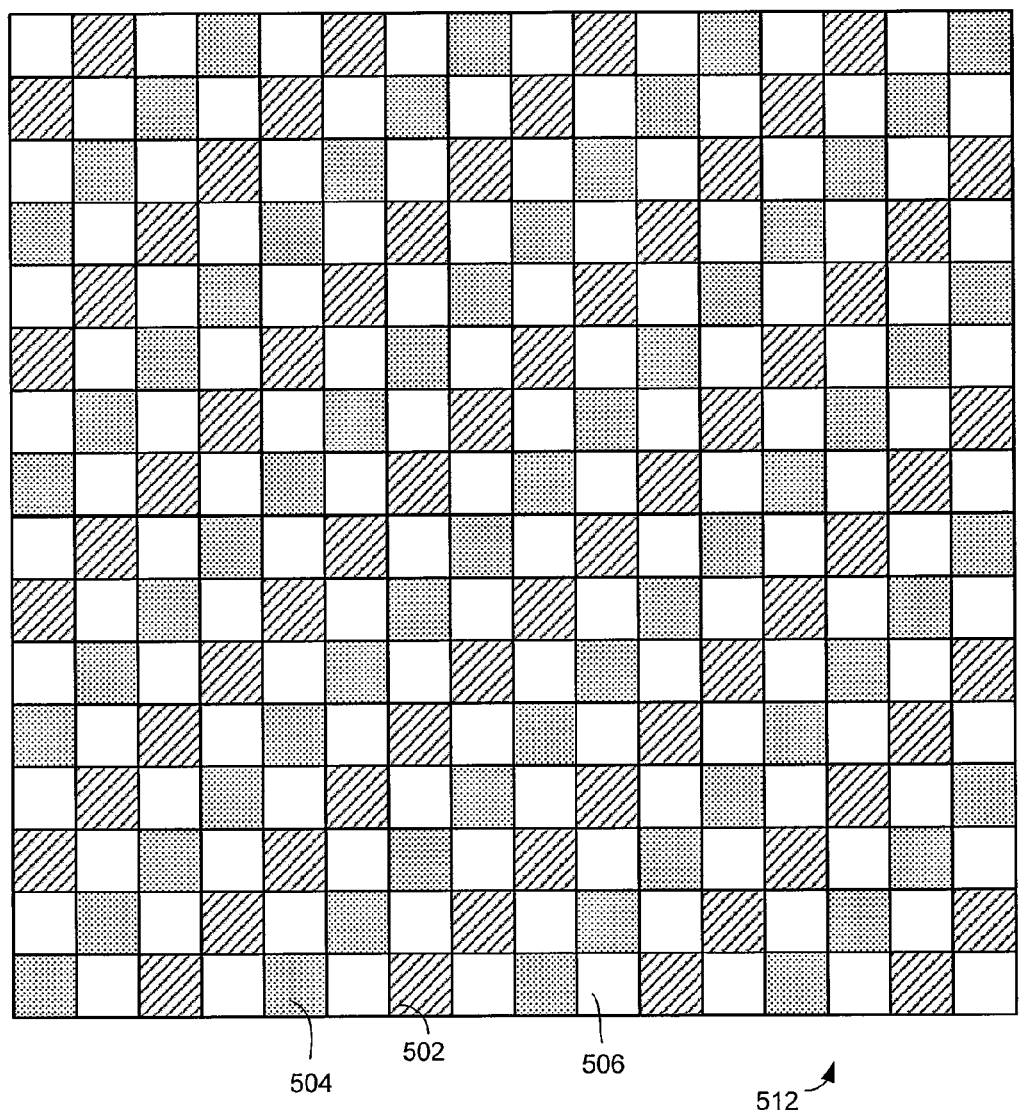
Figure 5C:
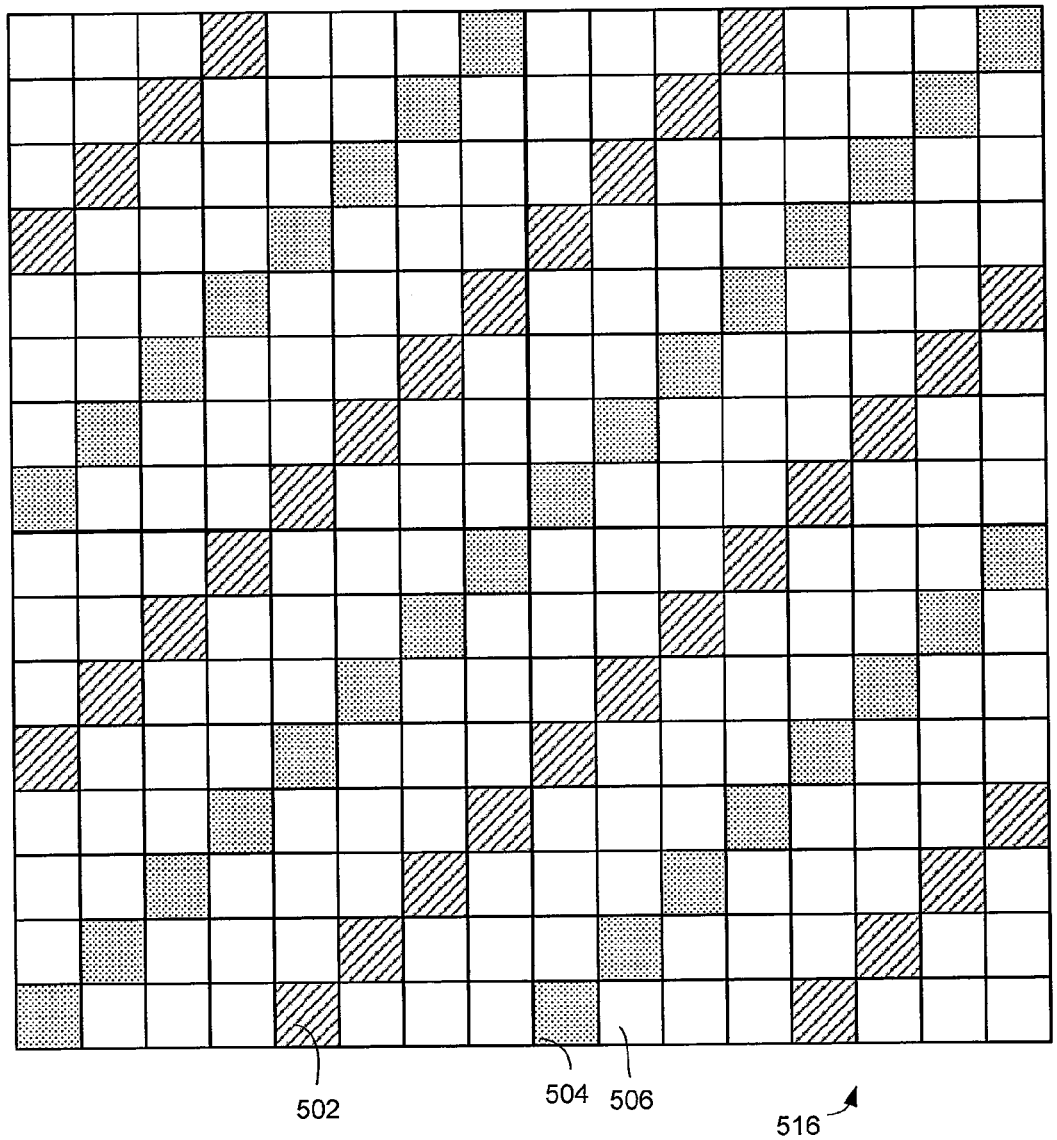
Figure 5D:
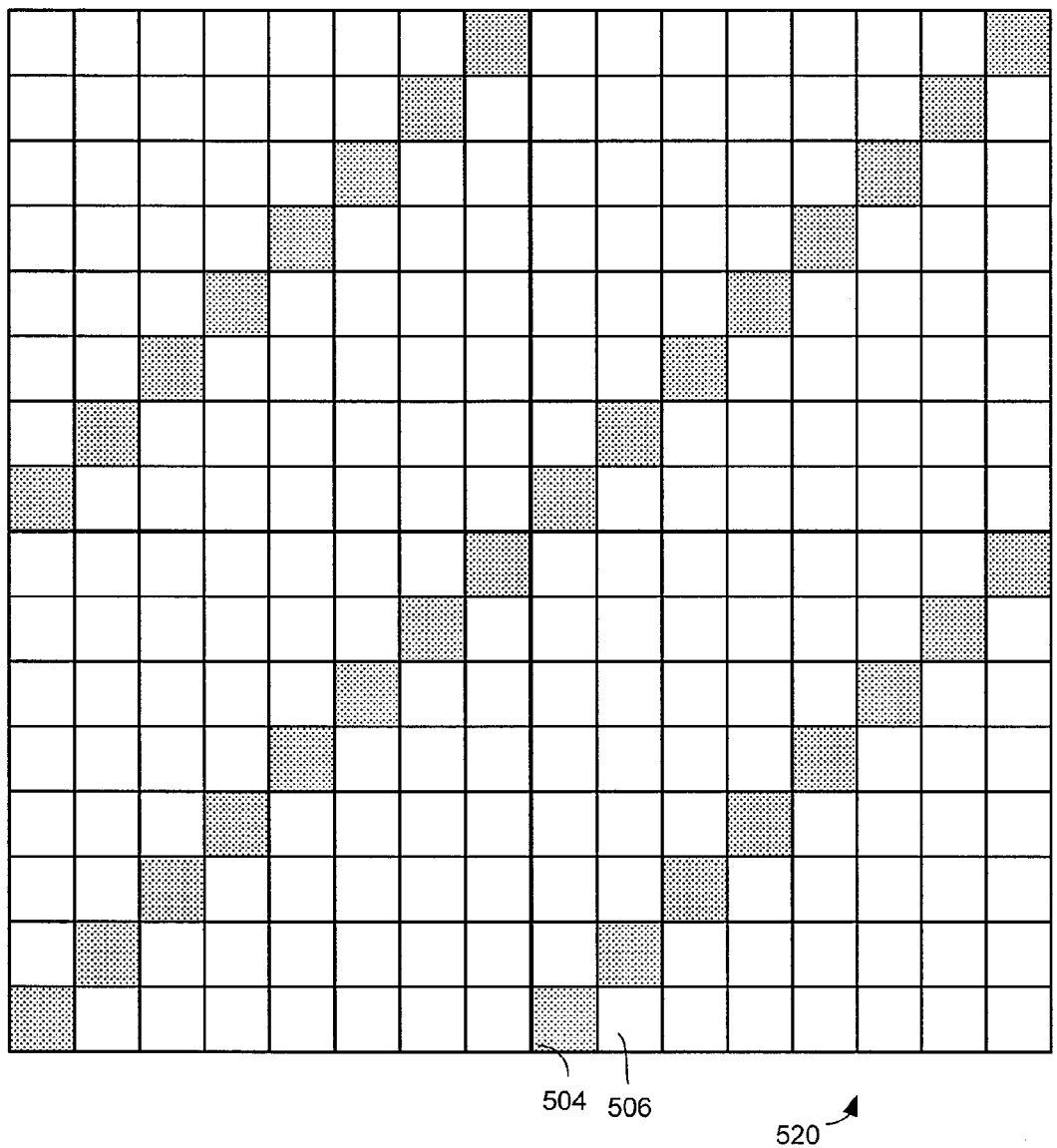
Figure 6C:
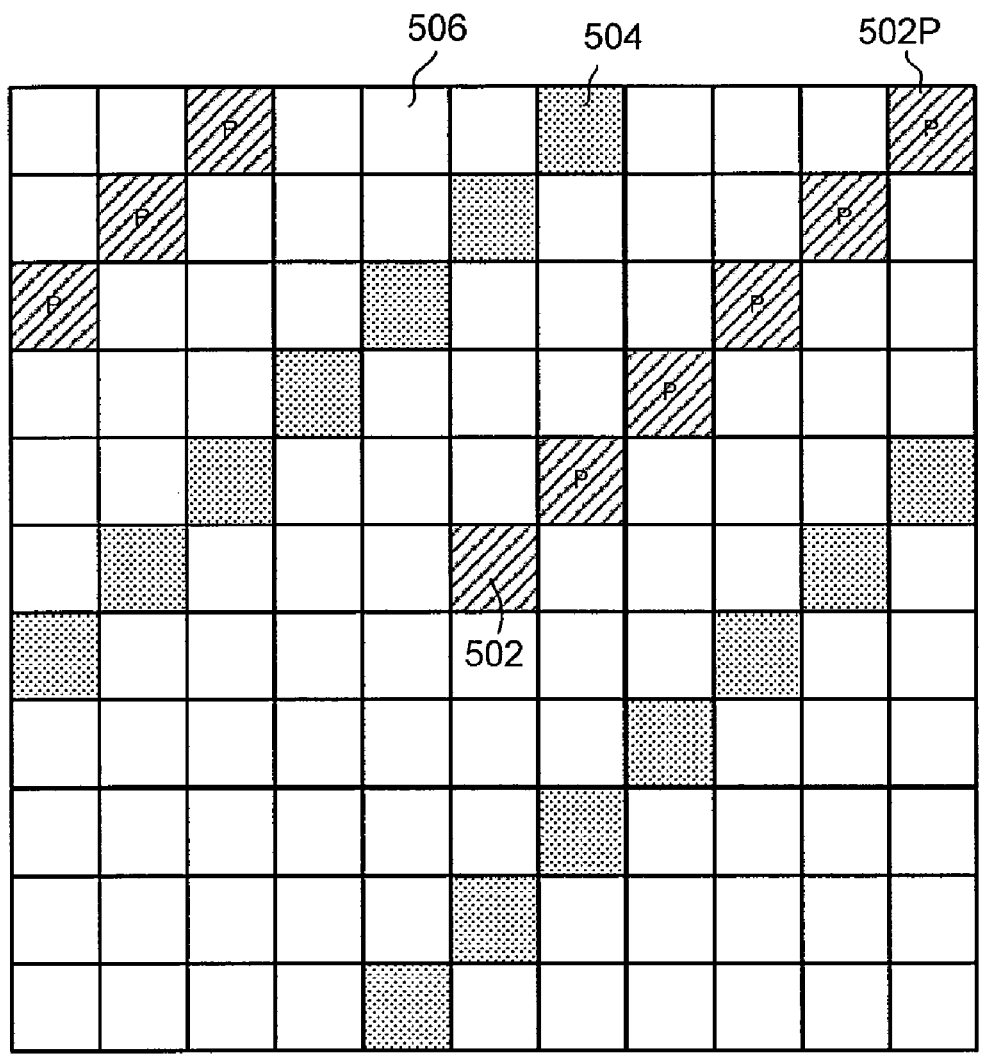

For example, FIGS. 5A through 5D are block diagrams showing exemplary spatial prediction templates according to other embodiments of the invention. The templates shown in FIGS. 5A through 5D can be used in the method 200 described above. FIGS. 6A through 6C show prediction neighborhoods for blocks to be predicted in the templates of FIGS. 5A through 5C, respectively. The templates are shown in FIGS. 5A through 5D in reverse order from their use in the method 200 (e.g., the last template used is shown in FIG. 5A and the first template used is shown in FIG. 5D). In FIGS. 5A through 5F, blocks 502 are blocks to be predicted in a particular stage, blocks 504 are blocks previously coded in another stage, and blocks 506 are blocks yet to be predicted.

FIG. 5A shows a template 508 for a last stage of intra prediction. The template 508 provides a strongest prediction for the blocks 502 to be predicted. FIG. 6A shows a prediction neighborhood 510 for the template 508. Notably, the neighborhood 510 includes four previously coded blocks 504, and two previously coded blocks 502P, surrounding a block 502 to be predicted with two blocks 506 yet to be predicted. As noted above, blocks 504 have been previously coded in another stage. Blocks 502P in the neighborhood 510 are those of the blocks 502 that have already been predicted in the current stage. Notably, the blocks 502 to be predicted in the current stage may be processed in a particular scan order such that some of the blocks 502 are available for use as predictors (denoted blocks 502P). The blocks 502 to be predicted may be predicted using bi-directional prediction, as shown in the neighborhood 510.

FIG. 5B shows a template 512 for a previous stage of intra prediction to the template 508. The template 512 provides a weaker prediction than the template 508. FIG. 6B shows a prediction neighborhood 514 for the template 512. Notably, the neighborhood 514 includes six previously coded blocks 504, and three previously coded blocks 502P, surrounding a block 502 to be predicted with 15 blocks 506 yet to be predicted. The blocks 502 to be predicted may be predicted using bi-directional prediction, as shown in the neighborhood 514.

FIG. 5C shows a template 516 for a previous stage of intra prediction to the template 512. The template 516 provides a weaker prediction than the template 512. FIG. 6C shows a prediction neighborhood 618 for the template 516. Notably, the neighborhood 518 includes 14 previously coded blocks 504, and eight previously coded blocks 502P, surrounding a block 502 to be predicted. The blocks 502 to be predicted may be predicted using bi-directional prediction, as shown in the neighborhood 518.

FIG. 5D shows a template 520 for a first stage of intra prediction. The previously coded blocks 504 in the template 520 are the initial reference blocks used for the spatial prediction process. The remaining blocks 506 yet to be predicted can be predicted hierarchically using the templates described above in FIGS. 5A through 5C. It is readily apparent from FIGS. 5A through 5D that the template sequence can be extended to more templates based on the pattern described above.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method of image encoding in a video encoder, comprising:
   selecting initial reference blocks from distinct portions of image;
   predicting sets of blocks in the image successively over a plurality of stages based on a respectively plurality of templates, each of the plurality of templates including reference blocks selected from at least one of: the initial reference blocks; or previously encoded and reconstructed blocks of the image; and
   encoding the image in the video encoder using the initial reference blocks and the sets of blocks as predicted,
   wherein the plurality of templates used for the predicting are used iteratively starting from a weakest template for prediction to a strongest template for prediction and the number of reference blocks increases successively with the iteration of the plurality of templates.

2. The method of claim 1, wherein the initial reference blocks include blocks previously encoded and reconstructed by the video encoder for the image.

3. The method of claim 1, further comprising:
   generating, as output, a stream including the image as encoded and the plurality of templates.

4. The method of claim 1, wherein more blocks are predicted from set-to-set of the sets of blocks successively over the plurality of stages.

5. The method of claim 1, wherein the plurality of templates is configured such that the predicting is stronger from set-to-set of the sets of blocks successively over the plurality of stages.

6. The method of claim 5, wherein the plurality of templates is configured such that the predicting is strongest for a last set of the set of blocks at a last stage of the plurality of stages.

7. The method of claim 1, further comprising:
   obtaining an image sequence to be encoded;
   repeating the steps of selecting, predicting, and encoding for a plurality of iterations where, for each of the iterations, the image is a respective one of a plurality of images to be intra-predicted in the image sequence.

8. An apparatus for image encoding in a video encoder, comprising:
   means for selecting initial reference blocks from distinct portions of an image;
   means for predicting sets of blocks in the image successively over a plurality of stages based on a respectively plurality of templates, each of the plurality of templates including reference blocks selected from at least one of: the initial reference blocks; or previously encoded and reconstructed blocks of the image; and
   means for encoding the image in the video encoder using the initial reference blocks and the sets of blocks as predicted,
   wherein the plurality of templates used for the predicting are used iteratively starting from a weakest template for prediction to a strongest template for prediction and the number of reference blocks increases successively with the iteration of the plurality of templates.

9. The apparatus of claim 8, wherein the initial reference blocks include blocks previously encoded and reconstructed by the video encoder for the image.

10. The apparatus of claim 8, further comprising:
    means for generating, as output, a stream including the image as encoded and the plurality of templates.

11. The apparatus of claim 8, wherein more blocks are predicted from set-to- set of the sets of blocks successively over the plurality of stages.

12. The apparatus of claim 8, wherein the plurality of templates is configured such that the predicting is stronger from set-to-set of the sets of blocks successively over the plurality of stages.

13. The apparatus of claim 12, wherein the plurality of templates is configured such that the predicting is strongest for a last set of the set of blocks at a last stage of the plurality of stages.

14. The apparatus of claim 8, further comprising:
    means for obtaining an image sequence to be encoded;
    means for repeating the steps of selecting, predicting, and encoding for a plurality of iterations where, for each of the iterations, the image is a respective one of a plurality of images to be intra-predicted in the image sequence.

15. An apparatus for image encoding, comprising:
    a prediction circuit configured to select initial reference blocks from distinct portions of an image, and predict sets of blocks in the image successively over a plurality of stages based on a respectively plurality of templates, each of the plurality of templates including reference blocks selected from at least one of: the initial reference blocks; or previously encoded and reconstructed blocks of the image; and
    an encoder circuit, coupled to the prediction circuit, configured to encode the image using the initial reference blocks and the sets of blocks as predicted, wherein the plurality of templates used for the predicting are used iteratively starting from a weakest template for prediction to a strongest template for prediction and the number of reference blocks increases successively with the iteration of the plurality of templates.

16. The apparatus of claim 15, wherein the initial reference blocks include blocks previously encoded and reconstructed by the encoder circuit for the image.

17. The apparatus of claim 15, further comprising:

an output circuit configured to generate, as output, a stream including the image as encoded by the encoder circuit and the plurality of templates.

18. The apparatus of claim 15, wherein more blocks are predicted from set- to-set of the sets of blocks successively over the plurality of stages.

19. The apparatus of claim 15, wherein the plurality of templates is configured such that the predicting is stronger from set-to-set of the sets of blocks successively over the plurality of stages.

20. The method of claim 19, wherein the plurality of templates is configured such that the predicting is strongest for a last set of the set of blocks at a last stage of the plurality of stages.

* * * * *